(12) United States Patent
Teshima (10) Patent No.: US 8,412,031 B2
(45) Date of Patent: Apr. 2, 2013

(54) CAMERA WITH A FUNCTION OF AUTOMATICALLY SETTING SHOOTING CONDITIONS AND SHOOTING METHOD

(75) Inventor: Yoshihiro Teshima, Higashimurayama (JP)

(73) Assignee: Casio Computer Co., Ltd., Tokyo (JP)

( * ) Notice: Subject to any disclaimer, the term of this patent is extended or adjusted under 35 U.S.C. 154(b) by 29 days.

(21) Appl. No.: 13/069,648

(22) Filed: Mar. 23, 2011

(65) Prior Publication Data
US 2011/0236005 A1 Sep. 29, 2011

(30) Foreign Application Priority Data

Mar. 23, 2010 (JP) ................................. 2010-065580

(51) Int. Cl.
*G03B 17/00* (2006.01)
*H04N 5/225* (2006.01)
(52) U.S. Cl. .......................... 396/49; 396/57; 348/207.1
(58) Field of Classification Search .................... 396/49, 396/56–57, 77, 310; 348/211.12, 345, 207.1, 348/207.11
See application file for complete search history.

(56) References Cited

U.S. PATENT DOCUMENTS 6,690,883 B2 *   2/2004   Pelletier ........................ 396/321
7,417,672 B2 *   8/2008   Nakajima et al. ........... 348/231.3
7,538,814 B2 *   5/2009   Igarashi et al. ................ 348/349
2010/0250588 A1 *   9/2010   Kita .............................. 707/769

FOREIGN PATENT DOCUMENTS

| JP | 2003-153069 A | 5/2003 |
| JP | 2007-259035 A | 10/2007 |
| JP | 2007-274264 A | 10/2007 |

OTHER PUBLICATIONS

Japanese Office Action dated Mar. 27, 2012 (and English translation thereof) in counterpart Japanese Application No. 2010-065580.

* cited by examiner

*Primary Examiner* — Christopher Mahoney
(74) *Attorney, Agent, or Firm* — Holtz, Holtz, Goodman & Chick, P.C.

(57) ABSTRACT

A camera with a function of automatically setting shooting conditions, is provided with a memory storing plural pieces of feature information of an object corresponding to different positions, respectively, the feature information of an object representing features of the object, a judging unit for, when a shooting operation is performed with the camera at a position to obtain an image, obtaining from the memory feature information corresponding to the camera position and judging whether or not an object corresponding to the obtained feature information is found in the image obtained in the shooting operation, and a shooting-operation controller for changing shooting conditions depending on the judgment made by the judging unit.

17 Claims, 7 Drawing Sheets

| POSITION INFORMATION | LENS DIRECTION | (MAIN OBJECT) FEATURE INFORMATION |
|---|---|---|
| POSITION A | DIRECTION a | FEATURE INFORMATION OF OBJECT (1) |
| | DIRECTION b | FEATURE INFORMATION OF OBJECT (2) |
| | DIRECTION c | FEATURE INFORMATION OF OBJECT (3) |
| | DIRECTION d | FEATURE INFORMATION OF OBJECT (4) |
| POSITION B | DIRECTION a | FEATURE INFORMATION OF OBJECT (5) |
| | DIRECTION b | FEATURE INFORMATION OF OBJECT (6) |
| | DIRECTION c | FEATURE INFORMATION OF OBJECT (7) |
| | DIRECTION d | FEATURE INFORMATION OF OBJECT (8) |
| ⋮ | ⋮ | ⋮ |

CAMERA WITH A FUNCTION OF AUTOMATICALLY SETTING SHOOTING CONDITIONS AND SHOOTING METHOD

BACKGROUND OF THE INVENTION

1. Field of the Invention

The present invention relates to a camera, which can automatically set shooting conditions, and to a shooting method using the camera.

2. Description of the Related Art

Conventional cameras, which can automatically set shooting conditions in a shooting operation are known and used. Japanese Patent No. 2007-274264 A discloses a camera, which detects a face of a person in an image within a shooting frame in a shooting mode, and obtains feature data representing features of the detected face. Then, the camera judges based on the obtained feature data, whether or not the person of the detected face has been found among those previously registered therein. When the person has been found in the registered data, the camera automatically sets the shooting conditions using parameters corresponding to such person found in the registered data, allowing the user of the camera to take a picture of the person of a high image quality.

However, in the conventional cameras or techniques, the shooting conditions are not automatically set for objects other than persons or figures. In other words, the shooting conditions are not automatically set for main objects other than persons, such as famous places, houses, buildings and scenes at specific spots.

SUMMARY OF THE INVENTION

According to one aspect of the present invention, there is provided a camera, which comprises a storing unit for storing plural pieces of feature information of an object corresponding to plural different positions, respectively, the feature information representing features of the object, a judging unit for, when a shooting operation is performed with the camera at a position to obtain an image, obtaining from the storing unit feature information corresponding to the position where the shooting operation is performed with the camera and judging whether or not an object corresponding to the obtained feature information is found in the image obtained in the shooting operation, wherein the object corresponding to the obtained feature information is an object whose features are represented by the obtained feature information, and a shooting-operation controlling unit for changing a shooting process to be performed in the shooting operation depending on the judgment made by the judging unit.

According to another aspect of the present invention, there is provided a shooting method using a camera, wherein the camera is provided with a storing unit, which stores plural pieces of feature information of an object corresponding to different positions, respectively, the feature information representing features of the object, the method, which comprises the steps of a judging step of, when a shooting operation is performed with the camera at a position to obtain an image, obtaining from the storing unit feature information corresponding to the position where the shooting operation is performed with the camera and judging whether or not an object corresponding to the obtained feature information is found in the image obtained in the shooting operation, wherein the object corresponding to the obtained feature information is an object whose features are represented by the obtained feature information, and a shooting-operation controlling step of changing shooting conditions depending on the judgment made at the judging step.

DETAILED DESCRIPTION OF THE PREFERRED EMBODIMENTS

The embodiments of the invention will be described in detail with reference to the accompanying drawings.

First Embodiment

Figure 1:
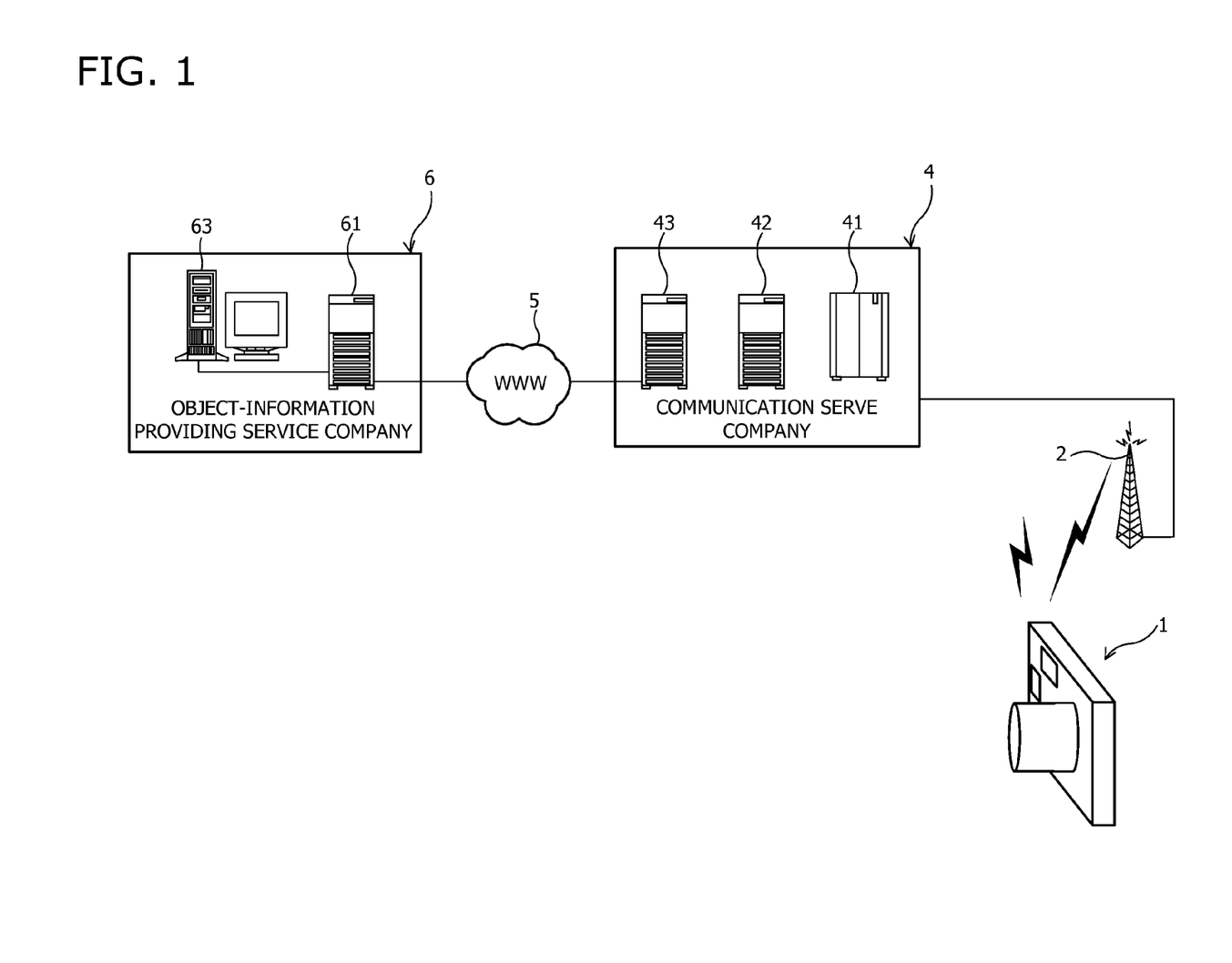
FIG. 1 is a view illustrating a configuration of an object-information sending/receiving system according to the first embodiment of the invention.

FIG. 1 is a view illustrating a configuration of an object-information sending/receiving system according to the first embodiment of the invention. In FIG. 1, a digital camera 1 has an information sending/receiving function in addition to a picture shooting function. The digital camera 1 serves to function as a terminal device. A radio base station 2 serves to connect the digital camera 1 with a communication service company 4 (including an internet service provider), the service of which the digital camera 1 subscribes.

The communication service company 4 is provided with facilities such as a system (Web server 43) for connecting to WWW 5 (World Wide Web, Internet), as will be described later and a mailing system (mail server 42) in addition to a communication-line processing unit 41 required for communication service. Further, the communication service company 4 has a function of making the radio base station 2 serve as an access point (AP) for connecting the digital camera 1 with WWW 5. An object-information providing service company 6 has a system (Web server 61) for connecting with WWW 5 and a management server 63.

Figure 2:
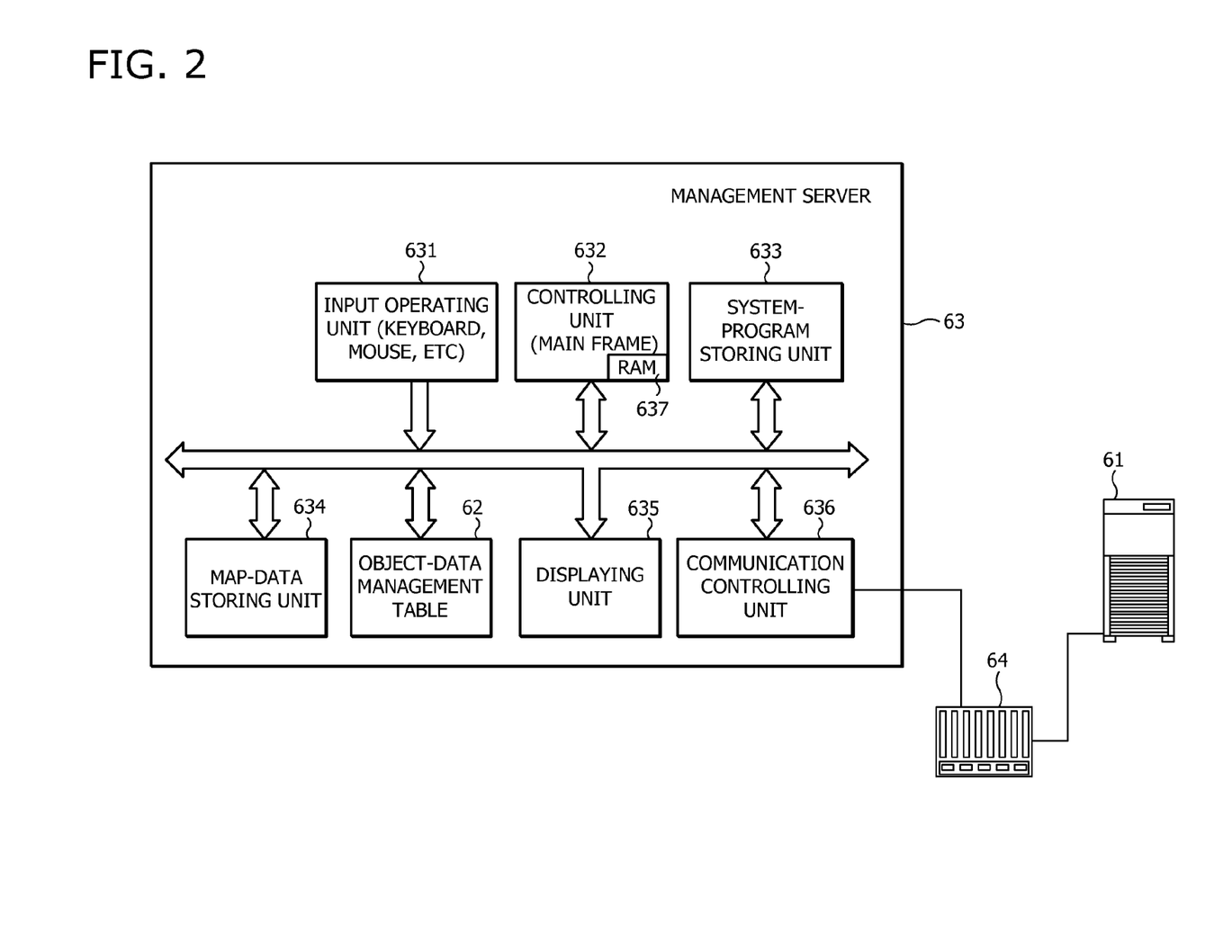
FIG. 2 is a block diagram showing a detailed configuration of a management server according to the first embodiment of the invention.

FIG. 2 is a block diagram showing a detailed configuration of the management server 63. As shown in FIG. 2, Web server 61 is connected with the management server 63 through a hub 64. The management server 63 is a system, which comprises an input operating unit (keyboard, mouse, etc.) 631, a controlling unit (main frame) 632, a system-program storing unit 633, a map-data storing unit 634, an object-data management table 62, a displaying unit 635 and a communication controlling unit 636, these units being connected to each other through a system bus.

Map data is stored in the map-data storing unit 634, together with information of names of existences such as objects to be shot, buildings, houses, mountains, and rivers appearing on a map and information indicating their positions on the map. The controlling unit 632 is provided with RAM 637 used as a work memory. The controlling unit 632 provides service, supplying the digital camera 1 operated by a register with the object information stored in the object-data management table 62 and/or allowing the digital camera 1 to download the object information or to upload object information to the object-data management table 62, with charge or with no charge. The system-program storing unit 633 stores a program, which is shown by a flow chart to be described later.

The object information is information, which associates a position and a direction of a specific object with feature information of the object. The object information can be information, which associates one of the position and direction of a specific object with the feature information of the object or associates both the position and direction of a specific object with the feature information of the object.

The feature information of an object is used to detect or judge in an image recognizing process, whether or not an image portion corresponding to a specific object is found in a shot or picked-up image. The feature information can be information, which is directly used in the image recognition such as information indicating images to be compared in the image recognition and/or indicating outlines, shapes or color of an object and information indicating a sort of the object.

Figure 3:
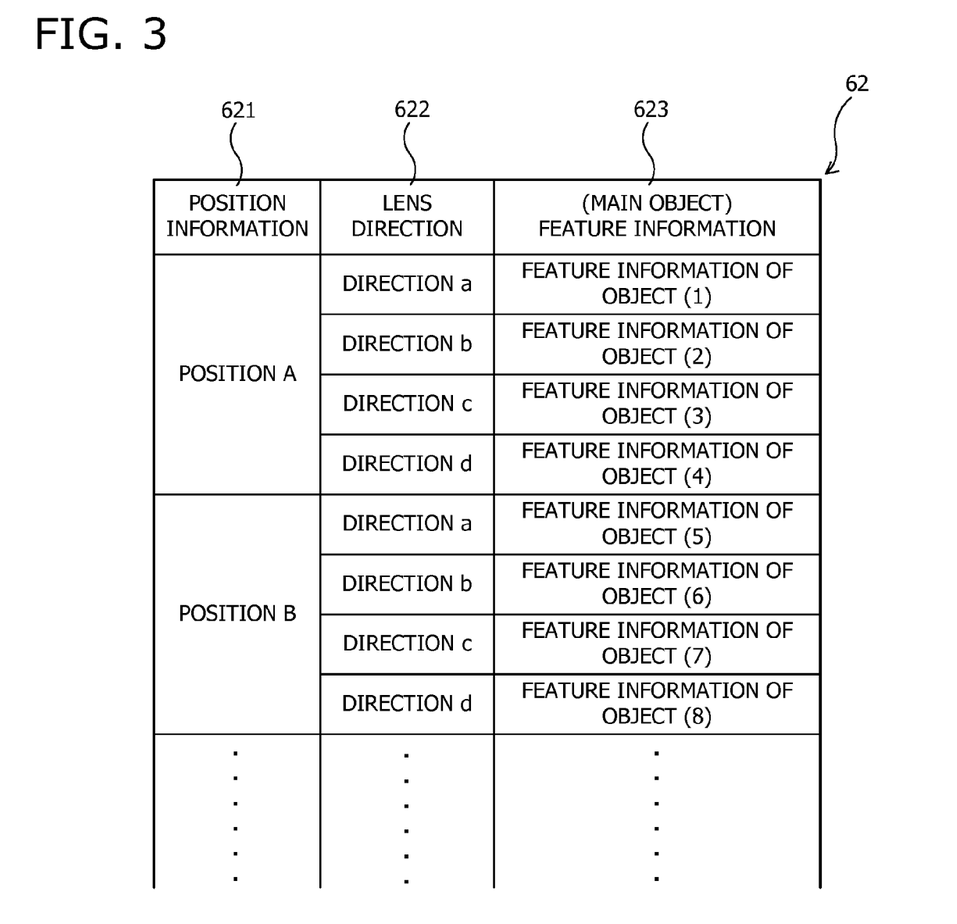
FIG. 3 is a view showing a memory configuration of an object-data management table according to the first embodiment of the invention.

FIG. 3 is a view showing a memory configuration of the object-data management table 62. The object-data management table 62 contains a position information area 621, a lens direction area 622 and a feature-information area 623.

In the position information area 621 are previously stored position information, "Position A", "Position B", etc. expressed in their latitudes and longitudes. In the lens direction area 622 are previously stored lens directions "Direction a", "Direction b", "Direction c" and "Direction d" (for instance, east, west, south and north) indicating lens directions corresponding respectively to plural pieces of position information. In the present embodiment, four lens directions "Direction a", "Direction b", "Direction c" and "Direction d" corresponding to four pieces of position information are prepared. But more lens directions such as 8 lens directions and/or 16 lens directions may be stored.

In the feature-information area 623 are stored feature information indicating features of objects "Object (1)", "Object (2)", etc., each of which is preferable to be a main object at a position indicated by the position information and in a direction indicated by the lens direction.

The feature-information area 623 functions as a storing unit for storing feature information representing features of an object corresponding respectively to plural separate positions. A specialized memory can be used as the storing unit.

Figure 4:
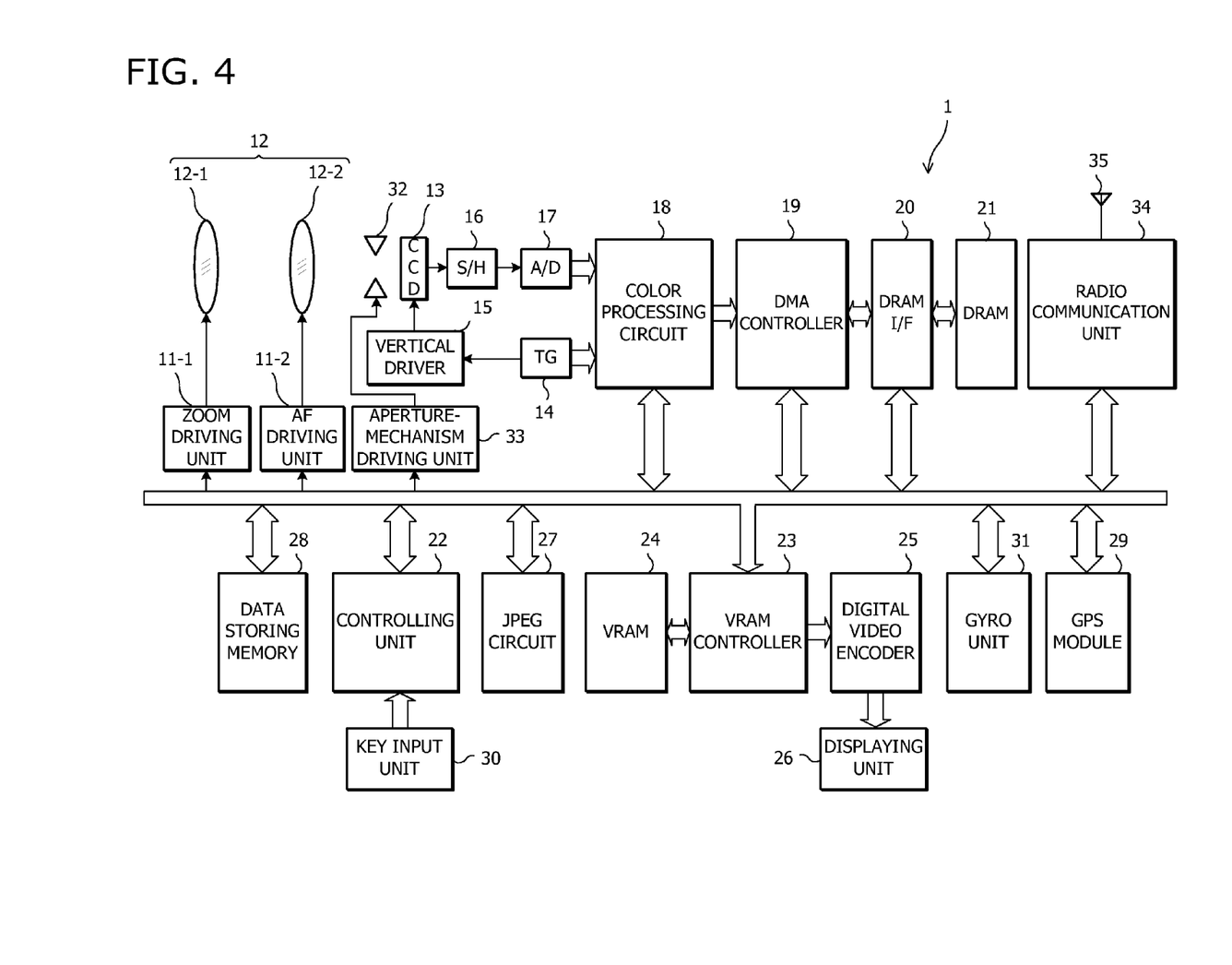
FIG. 4 is a view showing a circuit configuration of a digital camera according to the first embodiment of the invention.

FIG. 4 is a view showing a circuit configuration of the digital camera 1. The digital camera 1 is provided with a zoom driving unit 11-1, AF driving unit 11-2, and a lens optical system 12. The zoom driving unit 11-1 performs an optical zooming operation to move a zoom lens 12-1 in a basic mode, that is, a shooting mode. The AF driving unit 11-2 performs a focusing operation to move a focus lens 12-2 in the shooting mode. The lens optical system 12 comprises an image pick-up lens including the zoom lens 12-1 and focus lens 12-2.

Further, the digital camera 1 is provided with an aperture mechanism 32 disposed on an optical axis of the optical lens system 12, an aperture-mechanism driving unit 33 for driving the aperture mechanism 32, an image pick-up element or CCD 13, a timing generator (TG) 14, a vertical driver 15, a sample holding circuit (S/H) 16, A/D converter 17, a color processing circuit 18, DMA (Direct Memory Access) controller 19, DRAM interface (I/F) 20, and DRAM 21.

Further, the digital camera 1 is provided with a controlling unit 22, VRAM controller 23, VRAM 24, a digital video encoder 25, a displaying unit 26, JPEG (Joint Photographic Experts Group) circuit 27 and a data storing memory 28. The digital camera 1 is also provided with GPS (Global Positioning System) module 29, a key input unit 30, a gyro unit 31, a radio communication unit 34, and an antenna 35.

During a monitoring operation in the shooting mode, upon receipt of an instruction of an optical zooming operation, the zoom driving unit 11-1 drives a zoom-lens driving motor (not shown) in accordance with a control signal sent from the controlling unit 22 to move forward or rearward the zoom lens 12-1 along the optical axis, thereby varying a zoom factor, at which an image is formed on CCD 13. Meanwhile, AF driving unit 11-2 drives a focus-lens motor (nor shown) to move the focus lens 12-2. Then, CCD 13 or the image pick-up element disposed along the axis of the lens optical system 12 composing the image pick-up lens and behind the same system 12 is scanned by the timing generator (TG) 14 and the vertical driver 15, and periodically outputs one frame of photoelectric conversion output corresponding to an optical image formed on CCD 13.

CCD 13 is a solid-state image pick-up device for picking up a two dimensional image of an object, and typically picks up several ten images per second. The image pick-up element is not limited to CCD but a solid-state image pick-up device such as CMOS (Complementary Metal Oxide Semiconductor) may be employed.

The photoelectric conversion output is subjected to a gain adjustment in every analog RGB color components, sample-held by the sample holding circuit (S/H) 16 and converted into digital data (pixels)) by A/D converter 17. The digital data is subjected to a pixel interpolation process and a color processing process including a gamma correction process by the color processing circuit 18, whereby a digital luminance signal Y and color difference signals Cb, Cr are generated and supplied to DMA (Direct Memory Access) controller 19.

Using a composite sync signal, a memory writing enable signal and a clock signal output from the color processing circuit 18, DMA controller 19 DMA-transfers the luminance signal Y and the color difference signals Cb, Cr supplied from the color processing circuit 18 to DRAM 21 through DRAM interface (I/F) 20. This DRAM 21 is used as a buffer memory.

The controlling unit 22 controls whole operation of the digital camera 1. The controlling unit 22 comprises CPU or MPU (hereinafter, "CPU"), a program storing memory such as a flash memory, for storing a program for performing a process in accordance with a flow chart to be described later, and RAM used as a work memory. After having DMA-transferred to DRAM 21 the luminance signal Y and the color difference signals Cb, Cr, the controlling unit 22 reads the luminance signal Y and the color difference signals Cb, Cr from DRAM 21 through DRAM interface 20, and writes these signals into VRAM 24 through VRAM controller 23.

In response to a signal sent from the key input unit 30, the controlling unit 22 reads a process program and menu data corresponding respective to the operation modes from the program storing memory such as flash memory, and controls various operations of the digital camera 1. More specifically, the controlling unit 22 controls a shooting operation, an operation of the zoom lens in the optical zooming operation, a live-image displaying operation, an auto focusing operation, a shooting/recording operation, a shot image reproducing/displaying operation, a menu displaying operation for selecting a function, and a displaying operation for displaying a setting screen.

The digital video encoder 25 periodically reads the luminance signal Y and the color difference signals Cb, Cr from VRAM 24 through VRAM controller 23 to create a video signal based on the read signals, and outputs the created video signal to the displaying unit 26. The displaying unit 26 serves as a monitor (electronic finder) in the shooting mode, and displays an image based on the video signal sent from the digital video encoder 25, thereby displaying a live image based on image information currently obtained from the VRAM controller 23 at the time.

The controlling unit 22 performs a shooting/recording process in response to a shooting instruction. In the shooting/recording process, when triggered by operation on the shutter key, the controlling unit 22 gives CCD 13, the vertical driver 15, the sample holding circuit 16, the color processing circuit 18 and DMA controller 19 an instruction of switching from a through-image shooting mode to a still-image shooting mode, and temporarily stores in DRAM 21 image data obtained in the shooting/recording process in the still image shooting mode.

In a recording operation, the controlling unit 22 reads one frame of luminance signal and color difference signals from DRAM 21 through DRAM interface 20 in units of a so-called fundamental block of 8 pixels by 8 pixels of each of the components Y, Cb, and Cr, and writes the read signals to JPEG circuit 27. In JPEG circuit 27, the signals are subjected to ADCT (Adaptive Discrete Cosine Transform) and Huffman Coding process (entropy coding algorithm) for data compression. A data file of one image of the resultant coded data is read from JPEG circuit 27 and stored in the data storing memory 28. After performing the compressing process of compressing the one frame of luminance signal and color difference signals and the writing process of writing the whole compressed data onto the data storing memory 28, the controlling unit 22 gives an instruction of switching from the still-image shooting mode to the through-image shooting mode.

In a reproducing mode, which is the basic operation mode of the digital camera 1, the controlling unit 22 selectively reads image data stored in the data storing memory 28 and supplies the image data to JPEG circuit 27. JPEG circuit 27 expands the compressed image data in a process inverse to the compressing process, and writes the expanded image data in VRAM 24 through VRAM controller 23. The controlling unit 22 periodically reads the image data from VRAM 24, and reproduces a video signal from the image data, displaying the video signal on the displaying unit 26.

The data storing memory 28 comprises a recording medium such as a built-in memory (flash memory), a hard-disk drive and/or a detachable memory card, and serves to store image data and shooting conditions.

The key input unit 30 comprises a mode dial cursor key, SET key, zoom buttons (W-button, T-button), shutter key, clear key and power key, and a key processing unit (not shown), which generates an operation signal in response to a operated key and sends the operation signal to the controlling unit 22.

GPS module 29 receives, demodulates and analyses C/A code in L-1 band sent from the geodetic satellite, thereby determining a longitude and a latitude of the current position. Information (position information) of the longitude and latitude of the current position determined by the GPS module 29 is supplied to the controlling unit 22.

The gyro unit 31 has a gyro sensor for detecting a direction of the image pick-up lens, when the user holds the digital camera 1 with his or her hand(s), changing the direction of the image pick-up lens. The direction detected by the gyro sensor is supplied to the controlling unit 22. As the result, the controlling unit 22 receives position information of the digital camera 1 from GPS module 29, obtaining a shooting position and receives the direction of the image pick-up lens from the gyro unit 31, obtaining a shooting direction.

The radio communication unit 34 is connected with the antenna 35, and performs a communication process, including a modulation and/or demodulation process based on PSK (Phase Shift Keying) system and a CDMA mobile phone certifying process. The radio communication unit 34 controls WWW connection, and also performs a data process in accordance with a communication protocol. The radio communication unit comprises a packet-data generating circuit and a packet-data reproducing circuit.

Under shooting condition set in an object searching mode to be described later, "AF" (Auto Focusing) denotes a controlling operation executed by AF driving unit 1-2 to drive the focus lens 12-2, "AE" (Auto Exposure) denotes a controlling operation executed by the driving unit 33 to drive the aperture mechanism 32, and "Field-angle Adjustment" denotes a controlling operation executed by the zoom driving unit 11-1 to drive the zoom lens 12-1.

Figure 5A:
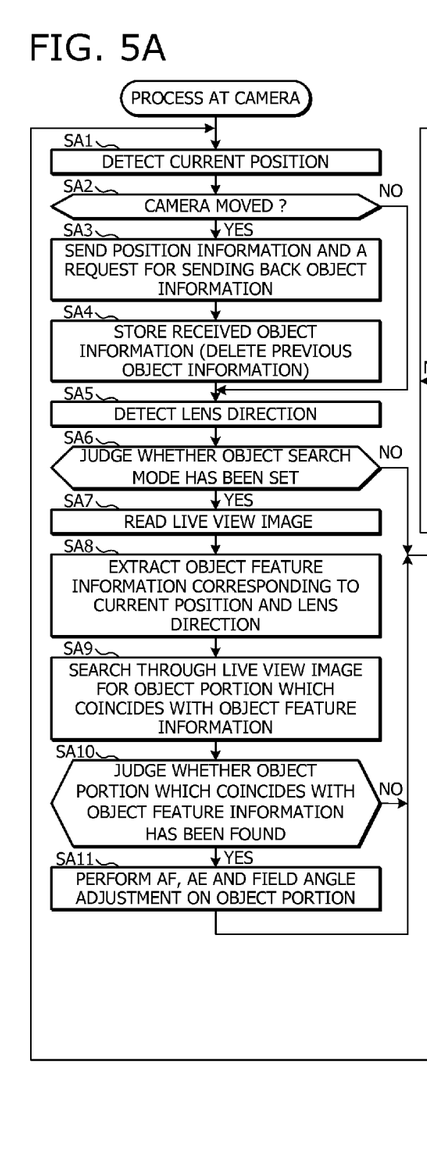
FIG. 5A is a flow chart of a process performed in the digital camera according to the first embodiment.
Figure 5B:
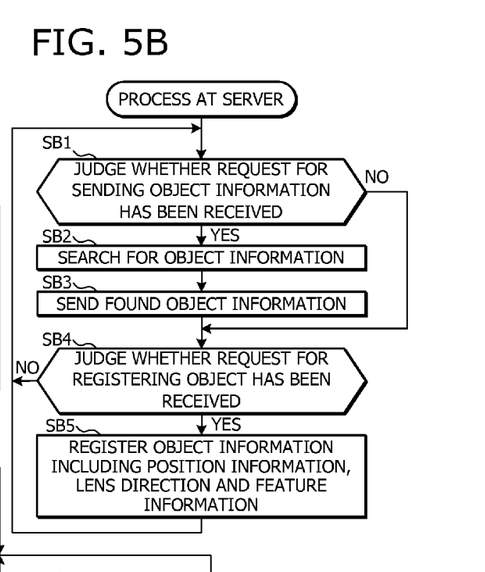
FIG. 5B is a flow chart of a process performed in the management server according to the first embodiment of the invention.

Now, the embodiment of the present invention will be described with reference to flow charts of FIG. 5A and FIG. 5B. FIG. 5A is a flow chart of a process to be performed in the digital camera 1 according to the present embodiment. FIG. 5B is a process to be performed in the management server 63 according to the present embodiment. The controlling unit 22 of the digital camera 1 reads the program from ROM to execute the process in accordance with the flow chart of FIG. 5A. The server 63 connected to the digital camera 1 reads the program from the system-program storing unit 633 to execute the process in accordance with the flow chart of FIG. 5B.

The controlling unit 22 of the digital camera 1 detects a current position of the digital camera 1 based on information transferred from GPS module 29 (step SA1 in FIG. 5A). The controlling unit 22 compares the currently detected position with a previously detected position, judging whether or not the digital camera 1 has been moved or changed in position (step SA2).

When it is determined at step SA2 that the digital camera has been changed in position (YES at step SA2), the controlling unit 22 sends the position information (latitude, longitude) indicating the position detected at step SA1 together with a request for sending back object information to other system through the radio communication unit 34 and the antenna 35 (step SA3). The position information and the request signal are sent to the system (Web server 61) of the object-information providing service company 6 through the base station 2, the communication service company 4, and WWW 5.

The management server 63 of the object-information providing service company 6 judges whether or not a request for sending back object information has been received (step SB1 in FIG. 5B). When it is determined at step SB1 that the request has been received (YES at step SB1), the management server 63 searches through the object-data management table 62 for object information corresponding to the received position information based on the position information sent from the digital camera 1 together with the request signal (step SB2). Thereafter, the management server 63 sends back the found object information (step SB3).

More specifically, supposing that a position indicated by the position information sent from the digital camera 1 is "Position A" given in FIG. 3, the following four sorts of information belonging to the "Position A" will be found and sent back as the object information: "Feature information representing features of an object (1)" and "Direction a"; "Feature information representing features of an object (2)" and "Direction b"; "Feature information representing features of an object (3)" and "Direction c"; and "Feature information representing features of an object (4)" and "Direction d".

Then, the controlling unit 22 of the digital camera 1 receives the object information, and deletes the previously stored object information from RAM and stores the currently received object information in RAM (step SA4). The gyro unit 31 detects the direction of the image pick-up lens (lens direction) of the digital camera 1 (step SA5).

It is more preferable, the more lens directions are prepared for each piece of position information, but in the present embodiment, only four lens directions, "Direction a", "Direction b", "Direction c" and "Direction d" are used for the sake of clear description. Therefore, the gyro unit 31 is not required to detect a fine angle, and only required to determine which lens direction the image pick-up lens takes, "Direction a", "Direction b", "Direction c" or "Direction d".

Then, the controlling unit 22 judges whether an object searching mode has been set or not (step SA6). When it is determined at step SA6 that the object searching mode has not yet been set (NO at step SA6), the controlling unit 22 advances directly to step SA12 without performing processes at step SA7 to step SA11.

When it is determined at step SA6 that the object searching mode has been set (YES at step SA6), the controlling unit 22 reads image information from VRAM 24 through VRAM controller 23 to obtain a live-view image (step SA7). Further, the controlling unit 22 extracts from RAM feature information of an object (object-feature information) corresponding to the current position and the lens direction (step SA8). More specifically, as described above, plural pieces of object-feature information corresponding respectively to the lens directions, "Direction a", "Direction b", "Direction c" and "Direction d" with respect to the current position of the digital camera 1 are stored in RAM in the process at step SA4. Therefore, if the lens direction is set in the direction of "Direction c", "Feature information representing the features of the object (3)" in the direction of "Direction c" will be extracted.

Then, the controlling unit 22 searches through a live view image for an object portion which coincides with the extracted object-feature information (step SA9), and judges whether or not the object portion which coincides with the extracted object-feature information has been found in the live view image (step SA10). When the object (3) is found in the live view image, it is determined at step SA10 that the object portion which coincides with the extracted object-feature information has been found in the live view image, that is, it is determined YES at step SA10.

The controlling unit 22 advances to step SA11, performing AF process, AE process and the field angle adjusting process on the object portion (or main object) which coincides with the extracted object-feature information. More particularly, the controlling unit 22 displays AF frame on the object portion (or main object) which coincides with the extracted object-feature information to indicate that the object is to be subjected to the auto focusing process. And the controlling unit 22 controls AF driving unit 11-2 to drive the auto focus lens 12-2, setting shooting conditions so as to focus on the object portion (or the main object) falling within AF frame.

Meanwhile, when it is determined at step SA10 that the object portion which coincides with the extracted object-feature information has not been found in the live view image (NO at step SA10), since shooting conditions are not automatically set on the main object but the previously set shooting conditions are maintained, the shooting conditions will be determined depending on the result of the judgment at step SA10. It will be possible to include an exposure condition, a focusing condition, a zooming condition and other shooting conditions in the shooting conditions to be determined.

Further, when it is determined at step SA10 that the object portion which coincides with the extracted object-feature information has not been found in the live view image (NO at step SA10), since AF frame indicating that the main object is to be subjected to the auto focusing process is not displayed on the main object, a shooting process will be changed depending on the result of the judgment at step SA10. It will be possible to include a display of a shooting guidance, an indication of recorded images and/or no image, and other various shooting processes in the shooting process to be changed.

The controlling unit 22 controls the aperture mechanism 32 to set proper shooting conditions, obtaining an appropriate exposure condition applied on the object portion (main object) within AF frame. Further, the controlling unit 22 controls the zoom driving unit 11-1 to drive the zoom lens 12-1, setting shooting conditions including, for instance, such a zoom factor that permits the object portion or the main object to occupy more portion of an area defined by the field angle. After setting all the shooting conditions, the controlling unit 22 gives notice using beeps or an LED display that all the shooting condition have been set.

In the processes at step SA7 to SA10, the controlling unit 22 serves as a judging unit (judging means) for reading from the storing unit feature information corresponding to the position of the camera, when a picture is shot with said camera to obtain an image, and for judging whether or not an object corresponding to the feature information is found in the obtained image, wherein the object corresponding to the feature information is an object whose features are represented by said feature information.

Further, in the process at step SA11, the controlling unit 22 serves as a shooting controlling unit (shooting controlling means) for determining or changing the shooting conditions depending on the result of the judgment at step SA10.

The controlling unit 22 executes the program to function as the judging unit and the shooting controlling unit but a specialized circuit(s) may be provided for such judging unit and shooting controlling unit.

As described above, the controlling unit 22 judges whether or not an object corresponding to the feature information is found in a live view image. When an object corresponding to the feature information is found in a live view image, the controlling unit 22 sets shooting conditions appropriate for the object on the assumption that the object is a main object to be shot. Therefore, it is possible for the digital camera 1 to automatically set shooting conditions at a higher possibility than conventional cameras. Further, it is possible for the digital camera 1 to automatically set shooting conditions appropriate for main objects other than figures, and therefore, the user of the digital camera 1 can take good pictures of famous buildings, houses and/or sceneries at beauty spots under proper shooting conditions.

Though objects such as figures or persons moves or do not stay at one place, objects such as buildings and houses stay at one place. Therefore, it is possible for the user of the digital camera to narrow down objects to be searched using information of shooting spot and the shooting direction. Even though a lot of objects to be searched have been registered, a process for specifying the main object can be effectively performed.

In the present embodiment, the shooting position and the shooting direction of the digital camera 1 are detected, and the object is specified based on the detected shooting position and shooting direction of the digital camera 1. Therefore, it is possible to further increase the possibility of automatically setting the shooting conditions.

The controlling unit 22 judges at step SA12 whether or not the shutter key has been depressed. When it is determined that the shutter key has been depressed (YES at step SA12), the controlling unit 22 performs a shooting/recording process at step SA13. More specifically, upon receipt of an operation signal from the shutter key, the controlling unit 22 is triggered to give an instruction of switching from the through-image shooting mode to the still-image shooting mode to CCD 13, the vertical driver 15, sample holding circuit 16, color processing circuit 18 and DMA controller 19, thereby obtaining image data in the shooting/recording process in the still-image shooting mode and temporarily storing the obtained image data in DRAM 21. One frame of luminance signal and color difference signals written in DRAM 21 are compressed in JPEG circuit 27 and recorded in the data storing memory 28.

With respect to the image represented by the image data recorded in the data storing memory 28, the main object has been subjected to AF process, AE process and the field angle adjustment at step SA11. Therefore, the digital camera 1 focuses on the main object, and can obtain and record an image of a proper field angle, shot under an appropriate exposure condition.

In the process at step SA12, the controlling unit 22 performs the shooting/recording process after the shutter key has been depressed, but when an automatic shooting mode is set, the controlling unit 22 performs the shooting/recording process before the shutter key is depressed.

When a canceling operation is performed by the user before the shutter key is depressed, the controlling unit 22 cancels the currently set shooting conditions or cancels an object to be subjected to the auto-focusing process. At this time, when plural pieces of object-feature information are extracted at step SA8, another object portion which coincides with following object feature will be subjected to the auto-focusing process after such object to be subjected to the auto-focusing process is cancelled.

Meanwhile, when it is determined at step SA6 that the object searching mode is not set (NO at step SA6), the controlling unit 22 advances directly to step SA12 without performing processes at steps SA7 to step SA11. In this case, when AF and AE are not performed at step SA11 and an auto-mode is set, the digital camera 1 automatically focuses on an object portion coming at the center of the shooting frame (AF) and automatically sets an appropriate exposure to be applied on such object portion (AE). When a manual mode is set, the focus lens 12-2 and the aperture mechanism 32 are driven in response to manipulation by the user. Both in the auto mode and in the manual mode, the user is allowed to determine the field angle, operating the zoom driving unit 11-1 to drive the zoom lens 12-1. Thereafter, the processes at steps SA12 and SA13 are performed and a shot image is stored in data storing memory 28.

Then, the controlling unit 22 judges at step SA14 whether or not an object registering mode has been set. When it is determined at step SA14 that the object registering mode has been set (YES at step SA14), the controlling unit 22 specifies a main object within the shot image based on focus information (step SA15).

More specifically, when the object searching mode is not set, AF process and AE process is performed on the object portion coming to the center of the shooting frame in the auto mode, and in the manual mode, the shooting/recording process is performed at step SA13, wherein the focus lens 12-2 and the aperture mechanism 32 are driven in response to user's manipulation, whereby the main object desired by the user is focused on. Therefore, the object portion, on which the camera focuses most precisely, the object portion applied most appropriate exposure, or the object portion which the camera focuses on most precisely and is subjected to the most appropriate exposure, in the shot image recorded in the shooting/recording process can be specified as the portion that the user desires.

Features of the specified object portion desired by the user are extracted and feature information representing the extracted features is generated at step SA16. The digital camera 1 sends the management server 63 a request for registering the object together with the feature information, the position information indicating the position of the digital camera 1 (detected at step SA1) and the lens direction detected at step SA5 (step SA17). The controlling unit 22 judges whether or not an instruction of terminating the shooting operation has been given (step SA18), wherein the instruction of terminating the shooting operation includes switching the operation mode to a reproducing mode and turning off the power. Until the instruction of terminating the shooting operation is given, the processes at steps SA1 to SA18 are repeatedly performed. When the instruction of terminating the shooting operation is given, the process in accordance with the flow chart of FIG. 5A finishes.

Meanwhile, the management server 63 judges whether or not the request for registering an object has been received (step SB4 in FIG. 5B). When the request for registering an object has been received (YES at step SB4), the management server 63 associates the received feature information, position information and lens direction with each other, and registers the associated information (object information) in the object-data management table 62. Assuming that the received position information indicates "Position B", the lens direction indicates "Direction d", and the feature information indicates "Feature information representing features of an object (8)", "Position B", "Direction d", and "Feature information representing features of an object (8)" are written in the position information area 621, the lens direction area 622, and the feature information area 623 of the object-data management table 62, respectively, as shown in FIG. 3.

In the processes at steps SA14 to SA17 and in the processes at steps SB1 to SB4, the controlling unit 22 of the digital camera 1 and the management server 63 serve as a memory controlling unit (memory controlling means) when a shot image is obtained, wherein the memory controlling unit generates feature information of an object, which is defined as a main object in the shot image, and associates the generated feature information and a shooting position of the camera in an object information, additionally storing the object information in the storing unit. The controlling unit 22 and the management server 63 run programs to realize the function of the memory controlling unit, but it is also possible to prepare a circuit specialized for the memory controlling unit.

In the object registering mode, the user is permitted to increase an information amount in the object-data management table 62, by storing object information of images which he or she has obtained. Further, if plural users use their own digital cameras 1, then one user can use the object information, which is previously registered by other user(s).

In the present embodiment, since the digital camera 1 communicates with the management server 62 to receive the object information, the digital camera 1 is not required to use much memory amount in order to store object information. Therefore, the digital camera 1 can afford much memory amount for using many pieces of object information to set shooting conditions. As the result, the possibility that can automatically set the shooting conditions is made higher in the digital camera 1 than in conventional cameras.

In the digital camera 1 according to the present embodiment, the object registering mode is prepared, in which the object information is sent to the management server 63, but it is possible for the digital camera 1 to prepare only the object searching mode and to perform only a receiving operation of receiving the object information from the management server 63, whereby a processing load of the digital camera 1 can be reduced.

Second Embodiment

Figure 6:
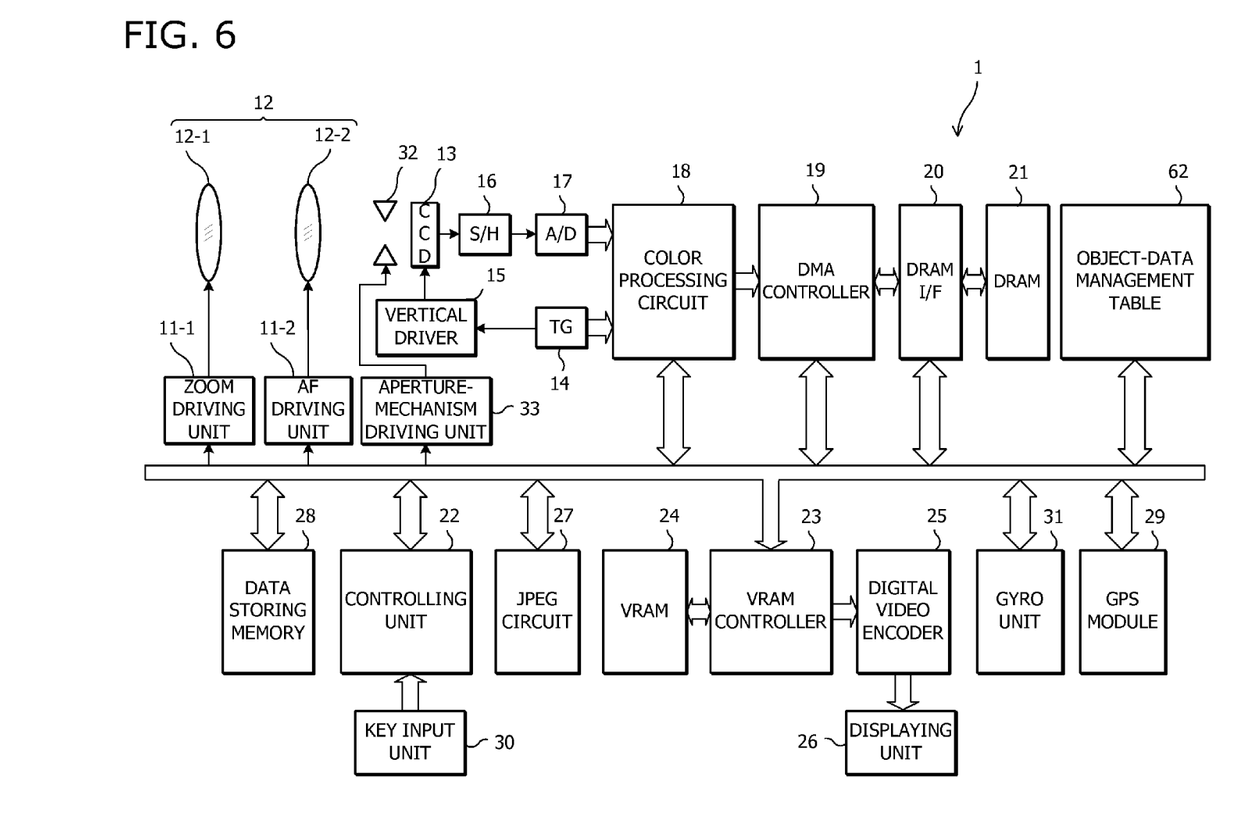
FIG. 6 is a block diagram of a circuit configuration of a digital camera according to the second embodiment of the invention.

FIG. 6 is a block diagram of a circuit configuration of a digital camera 1 according to the second embodiment of the invention. In the second embodiment, the object-information sending/receiving system used in the first embodiment is not used but only the digital camera 1 is used. The digital camera 1 according to the second embodiment has not the radio communication unit 32 shown in FIG. 1, but is provided with an object management table 62 instead of the radio communication unit 32. The object management table 62 has substantially the same memory configuration as that (shown in FIG. 3) provided in the management server 62 in the first embodiment.

Figure 7:
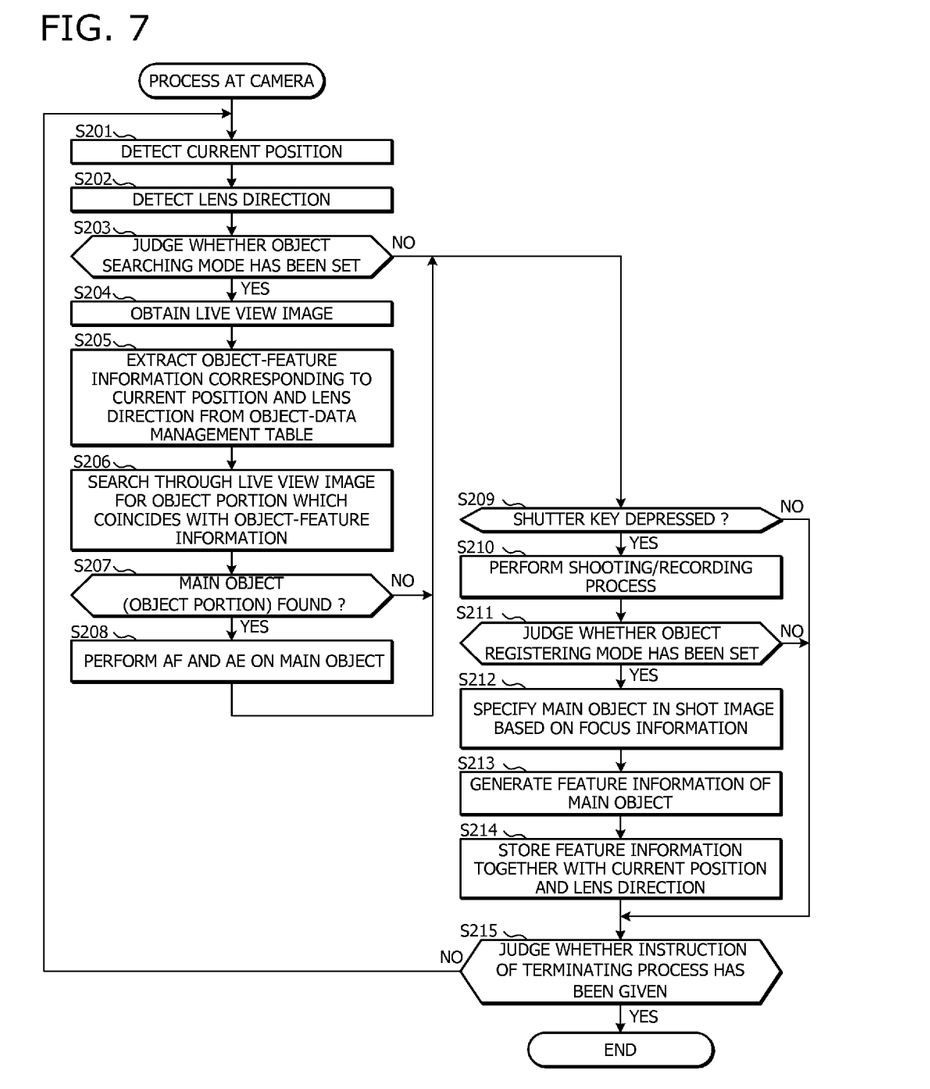
FIG. 7 is a flow chart of a process performed in the digital camera according to the second embodiment of the invention.

The operation of the digital camera 1 according to the second embodiment will be described with reference to a flow chart of FIG. 7. FIG. 7 is the flow chart of a process performed in the digital camera 1 according to the second embodiment of the invention. The digital camera 1 detects its own current position based on information from GPS module 29 (step S201). The gyro unit 31 detects lens direction, that is, the direction of the image pick-up lens of the digital camera 1 (step S202).

Then, the controlling unit 22 judges whether or not the object searching mode has been set (step S203). When it is determined that the object searching mode has not been set (NO at step S203), the controlling unit 22 advances directly to step S209, without performing processes at steps S204 to step S208.

When it is determined that the object searching mode has been set (YES at step S203), the controlling unit 22 reads image information from VRAM 24 through VRAM controller 23, thereby obtaining a live view image (step S204). Further, the controlling unit 22 extracts object features corresponding to the current position of the digital camera 1 and the lens direction from the object-data management table 62 (step S205). More specifically, if the current position of the digital camera 1 is "Position A" and the lens direction is "Direction c", "Feature information indicating features of the object (3)", that is, the object-feature information corresponding to the "Position A" and "Direction c" is extracted from the object-data management table 62.

The controlling unit 22 searches through the live view image for an object portion which coincides with the extracted object-feature information (step S206), and judges whether or not the object portion which coincides with the extracted object-feature information has been found in the live view image (step S207). If the object (3) is found in the live view image, it is determined that the object portion indicated by the feature information is found in the live view image, and the judgment at step S207 will be YES.

When it is determined YES at step S207, the controlling unit 22 advances to step S208, where the object portion which coincides with the extracted object-feature information is determined as the main object, and the main object is subjected to AF process, AE process and the field angle adjustment. More specifically, the controlling unit 22 controls the AF driving unit 11-2 to drive the focus lens 12-2, setting a shooting condition, under which the object portion, that is, the main object is focused on, and further the controlling unit 22 controls the aperture-mechanism driving unit 33 to drive the aperture mechanism 32, setting a shooting condition, under which the object portion, that is, the main object is subjected to an appropriate exposure. Furthermore, the controlling unit 22 controls the zoom driving unit 11-1 to drive the zoom lens 12-1, setting a shooting condition, under which the object portion, that is, the main object will occupy more portion of the area defined by the field angle.

Since the controlling unit 22 judges whether or not an object which coincides with the feature information is found in the live view image, and when it is determined that such object is found in the live view image, shooting conditions are set for such object as the main object. Therefore, the shooting conditions are automatically set at a higher possibility in the digital camera 1 than in conventional cameras. For main objects other than figures or persons, the shooting conditions can be automatically set, and therefore, the users of the digital camera 1 can take good pictures of famous buildings, houses and/or sceneries at beauty spots under proper shooting conditions.

Thereafter, the controlling unit 22 judges whether or not the shutter key has been depressed (step S209). When it is determined at step S209 that the shutter key has been depressed (YES at step S209), the controlling unit performs the shooting/recording process at step S210. More specifically, upon receipt of an operation signal from the shutter key, the controlling unit 22 is triggered to give an instruction of switching from the through-image shooting mode to the still-image shooting mode to CCD 13, the vertical driver 15, sample holding circuit 16, color processing circuit 18 and DMA controller 19, thereby obtaining image data in the shooting/recording process in the still-image shooting mode and temporarily storing the obtained image data in DRAM 21. One frame of luminance signal and color difference signals written in DRAM 21 are compressed in JPEG circuit 27 and recorded in the data storing memory 28.

Meanwhile, when it is determined at step S203 that the object searching mode is not set (NO at step S203), the controlling unit 22 advances directly to step S209 without performing processes at step S204 to step S208. In this case, when AF and AE are not performed at step S211 and the auto-mode is set, the digital camera 1 automatically focuses on an object portion coming to the center of the shooting frame (AF) and automatically sets an appropriate exposure on such object portion (AE). When the manual mode is set, the focus lens 12-2 and the aperture mechanism 32 are driven in response to manipulation by the user. When the zoom lens 12-1 is driven by the zoom driving unit 11-1 in response to manipulation by the user, the field angle is determined as the user desires. Thereafter, the processes at steps SA12 and SA13 are performed and a shot image is stored in data storing memory 28.

Then, the controlling unit 22 advances to step S211 to judge whether or not the object registering mode has been set.

When it is determined at step S211 that the object registering mode has been set (YES at step S211), the controlling unit 22 specifies a main object within the shot image based on focus information (step S212).

More specifically, when the object searching mode is not set, AF process and AE process is performed on the object portion coming to the center of the shooting frame in the auto mode, and in the manual mode, the shooting/recording process is performed at step S210, wherein the focus lens 12-2 and the aperture mechanism 32 are driven in response to user's manipulation, whereby the main object desired by the user is focused on. Therefore, the object portion, on which the camera focuses most precisely, the object portion subjected to most appropriate exposure, or the object portion which the camera focuses on most precisely and is subjected to the most appropriate exposure, in the shot image recorded in the shooting/recording process can be specified as the portion that the user desires.

Features of the specified object portion desired by the user are extracted and feature information representing the extracted features is generated at step S213. The feature information, the position information indicating the position of the digital camera 1 (detected at step S201) and the lens direction (detected at step S202) are stored in the object-data management table 62 (step S214). More specifically, assuming that the current position of the digital camera 1 is "Position B", the lens direction is "Direction d", and the feature information is "Feature information representing features of the object (8)", then "Position B", "Direction d" and "Feature information representing features of the object (8)" are written and stored in the position information area 621, the lens direction area 622, and the feature information area 623 of the object-data management table 62, respectively, as shown in FIG. 3.

In the object registering mode, the user is allowed to increase an information amount in the object-data management table 62, by storing object information of images which he or she has shot. Therefore, when plural users or family members use one digital camera 1, one user can use the object information, which is previously registered by other user(s).

The controlling unit 22 judges whether or not an instruction of terminating the shooting operation has been given (step S215), wherein the instruction of terminating the shooting operation includes switching the operation mode to a reproducing mode and turning off the power. Until the instruction of terminating the shooting operation is given, the processes at steps S201 to S215 are repeatedly performed.

When the instruction of terminating the shooting operation is given, the process in accordance with the flow chart of FIG. 7 finishes.

In the processes at steps S204 to S207, the controlling unit 22 serves as a judging unit (judging means) for reading from the storing unit feature information corresponding to the position of the camera, when a picture is shot with said camera to obtain an image, and for judging whether or not an object corresponding to the feature information is found in the obtained image.

Further, in the process at step S208, the controlling unit 22 serves as a shooting controlling unit (shooting controlling means) for determining or changing the shooting conditions depending on the result of the judgment at step S207.

In the processes at steps S211 to S214, the controlling unit 22 serves as a memory controlling unit (memory controlling means) when a shot image is obtained, wherein the memory controlling unit generates feature information of an object, which is defined as a main object in the shot image, and associates the generated feature information and a shooting position of the camera in object information, additionally storing the object information in the storing unit. The controlling unit 22 executes a program to function as the judging unit, the shooting controlling unit and the memory controlling unit, but circuit(s) specialized for such judging unit, shooting controlling unit and memory controlling unit may be provided in stead of the controlling unit 22.

In the second embodiment, the shooting position and the shooting direction of the digital camera 1 are detected, and the main object is specified based on the feature information corresponding to the detected shooting position and shooting direction of the digital camera 1. But an arrangement may be made, in which only the shooting position of the digital camera 1 is detected, and the main object is specified based on the feature information corresponding to the detected shooting position of the digital camera 1.

In the digital camera 1 according to the second embodiment, the object registering mode is prepared, in which the object information is registered in the object-data management table 62, but it is possible for the digital camera 1 to prepare only the object searching mode, whereby a processing load of the digital camera 1 can be reduced.

What is claimed is:

1. A camera, comprising:
    a storing unit which stores plural pieces of feature information of an object corresponding to plural different positions, respectively, the feature information representing features of the object;
    a judging unit which, when a shooting operation is performed with the camera at a position to obtain an image, obtains from the storing unit a piece of feature information from among the plural pieces of feature information corresponding to the position at which the shooting operation is performed with the camera, and which judges whether or not an object corresponding to the obtained feature information is found in the image obtained in the shooting operation, wherein the object corresponding to the obtained feature information is an object whose features are represented by the obtained feature information;
    a shooting-operation controlling unit which changes a shooting process to be performed in the shooting operation depending on the judgment made by the judging unit; and
    a memory controlling unit which, when the shooting operation is performed to obtain an image, generates feature information of an object in the image obtained in the shooting operation, and which adds and stores in the storing unit the generated feature information in association with the position at which the shooting operation is performed,
    wherein when a camera position is changed, the judging unit determines whether or not an object, corresponding to feature information successively changed in response to the change in the camera position, is found in an image successively changed in response to the change in the camera position; and
    wherein the shooting-operation controlling unit, in a shooting-operation standby mode, successively changes the object, which is currently a main object, in response to a result of determination performed by the judging unit, and, if shooting instructions are issued, then shoots the object, which is set as the main object, with shooting conditions set in accordance with the main object.

2. The camera according to claim 1,
    wherein, when the judging unit determines that the object corresponding to the obtained feature information is found in the image obtained in the shooting operation, the shooting-operation controlling unit changes the shooting conditions, under which the object will be shot as the main object in the shooting operation, and wherein the memory controlling unit generates, when the shooting operation is performed to obtain an image, feature information of the object which is the main object in the image obtained in the shooting operation, and adds and stores in the storing unit the generated feature information in association with the position at which the shooting operation is performed.

3. The camera according to claim 1, wherein the judging unit performs an image recognizing process to judge whether or not the object corresponding to the obtained feature information is found in the image obtained in the shooting operation.

4. The camera according to claim 3, wherein the judging unit performs an image recognizing process to specify an image portion of the image obtained in the shooting operation, at which the object corresponding to the obtained feature information is found in said obtained image, and the shooting-operation controlling unit changes shooting conditions so as to execute an automatic focusing adjustment or an automatic exposure adjustment on the specified image portion of the obtained image.

5. The camera according to claim 1, wherein the shooting-operation controlling unit automatically sets shooting conditions for the object which is found by the judging unit, and wherein the shooting conditions include at least one of focusing on the object, an exposure adjustment, and a field angle adjustment in an optical system.

6. The camera according to claim 1, wherein the storing unit stores plural pieces of feature information of an object corresponding to one position, and the judging unit reads from the storing unit plural pieces of feature information corresponding to a position of the camera, when the shooting operation is performed with the camera, and judges whether or not an object corresponding to any one of the plural pieces of feature information read from the storing unit is found in the image obtained in the shooting operation.

7. The camera according to claim 1, wherein the storing unit stores plural pieces of feature information of an object corresponding to plural different positions and plural different directions, respectively, and the judging unit obtains from the storing unit the feature information corresponding to a position and a direction of the camera, when the shooting operation is performed with the camera, and judges whether or not an object corresponding to the obtained feature information is found in the image obtained in the shooting operation.

8. The camera according to claim 1, further comprising:
a displaying unit which displays an image,
wherein the judging unit successively judges whether or not the object corresponding to the obtained feature information is found in images, which are successively obtained and displayed in live view on the displaying unit in the shooting operation.

9. The camera according to claim 1, wherein the shooting-operation controlling unit executes the shooting operation under shooting conditions changed depending on the judgment made by the judging unit to obtain and store images.

10. The camera according to claim 1,
wherein the storing unit stores plural pieces of object information, each piece of object information including position information and feature information of an object associated with each other,
wherein the memory controlling unit generates feature information of an object which will be the main object in the image obtained in the shooting operation, and adds and stores in the storing unit object information including the generated feature information and the shooting position associated with each other.

11. The camera according to claim 10, further comprising:
an operation controlling unit for switching between a changing operation of shooting conditions to be performed by the shooting-operation controlling unit depending on the judgment made by the judging unit and an additionally storing operation of the object information to be performed by the memory controlling unit, in accordance with a set operation mode.

12. The camera according to claim 1, further comprising:
a receiving unit for receiving feature information of an object corresponding to a current position of the camera through a network,
wherein the judging unit uses the feature information received by the receiving unit to judge whether or not an object corresponding to the received feature information is found in the image obtained in the shooting operation.

13. The camera according to claim 12, wherein the memory controlling unit stores in the storing unit the feature information received by the receiving unit, and the judging unit uses the feature information received by the receiving unit and stored in the storing unit to judge whether or not an object corresponding to the received and stored feature information is found in the image obtained in the shooting operation.

14. The camera according to claim 13, wherein the receiving unit receives through the network plural pieces of feature information of an object corresponding to a current position of the camera, which correspond to plural directions, respectively, and stores the received plural pieces of feature information in the storing unit, and the judging unit uses the feature information corresponding to a current camera direction from among the plural pieces of feature information received by the receiving unit and stored in the storing unit to judge whether or not an object corresponding to the used feature information is found in the image obtained in the shooting operation.

15. A shooting method for a camera, wherein the camera comprises a storing unit, which stores plural pieces of feature information of an object corresponding to different positions, respectively, the feature information representing features of the object, the method comprising:
when a shooting operation is performed with the camera at a position to obtain an image, obtaining from the storing unit a piece of feature information from among the plural pieces of feature information corresponding to the position at which the shooting operation is performed with the camera and judging whether or not an object corresponding to the obtained feature information is found in the image obtained in the shooting operation, wherein the object corresponding to the obtained feature information is an object whose features are represented by the obtained feature information;
changing shooting conditions depending on the judgment; and
when the shooting operation is performed to obtain an image, generating feature information of an object in the image obtained in the shooting operation, and adding and storing in the storing unit the generated feature information in association with the position at which the shooting operation is performed;
when a camera position is changed, determining whether or not an object corresponding to feature information, successively changed in response to the change in the camera position, is found in an image successively changed in response to the change in the camera position; and in a shooting-operation standby mode, successively changing the object, which is currently a main object, in response to a result of the determining, and, if shooting instructions are issued, shooting the object, which is set as the main object, with shooting conditions set in accordance with the main object.

16. The shooting method according to claim 15, further comprising:

receiving feature information of an object corresponding to a current position of the camera from a server through a network; and storing in the storing unit the received feature information.

17. The shooting method according to claim 16, wherein in the receiving, plural pieces of feature information of an object corresponding to a current position of the camera, which correspond to plural directions, respectively, are received through the network, and in the judging, the feature information corresponding to a current camera direction is selected from among the plural pieces of feature information received and stored in the storing unit in the receiving and the selected feature information is used to judge whether or not an object corresponding to the used feature information is found in the image obtained in the shooting operation.

* * * * *